Patented Feb. 19, 1929.

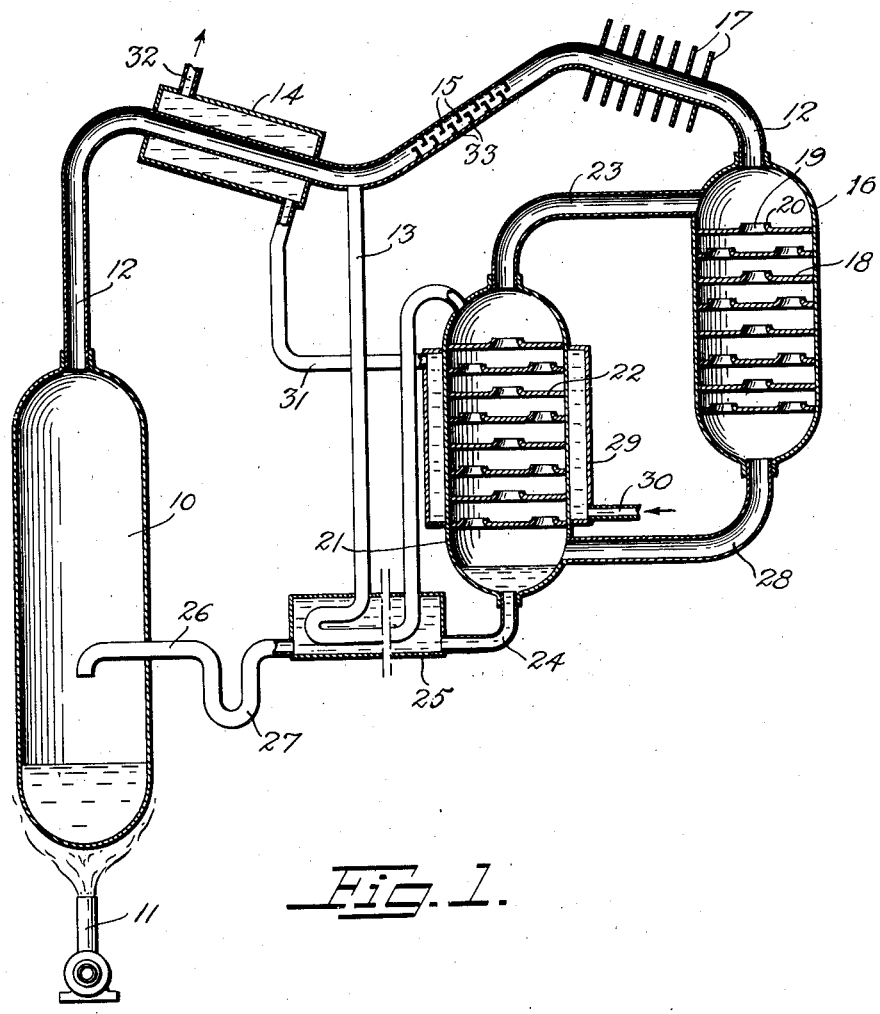

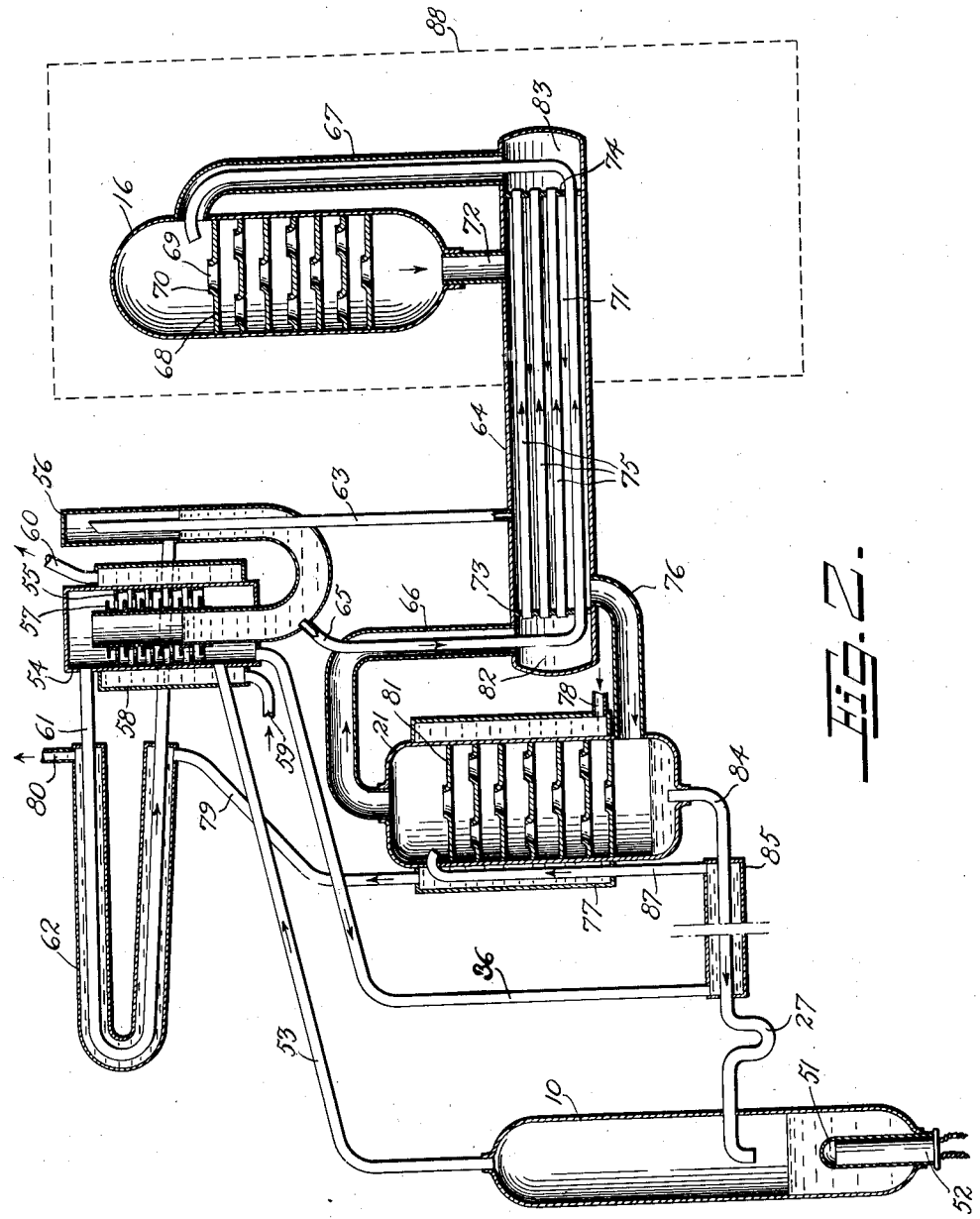

1,702,754

UNITED STATES PATENT OFFICE

KARL ALEXANDER WESSBLAD, OF STOCKHOLM, SWEDEN, ASSIGNOR TO ELECTROLUX SERVEL CORPORATION, OF NEW YORK, N. Y., A CORPORATION OF DELAWARE.

REFRIGERATION.

Application filed April 13, 1927, Serial No. 183,605, and in Germany October 9, 1926.

The invention relates to the art of refrigeration, more particularly to refrigerating apparatus of the absorption type and still more particularly to refrigerating apparatus wherein circulation of the fluids used therein is accomplished entirely by forces generated within the system.

One object of the invention is to provide an improved method of circulating the refrigerant and the absorbing medium. This and other objects and advantages will be apparent from the following description and accompanying drawings of which:

Fig. 1 is a more or less diagrammatic representation of an apparatus made according to the invention; and Fig. 2 is an elevational cross-sectional view showing another apparatus embodying the invention.

Referring more particularly to Fig. 1, reference character 10 designates a generator which is arranged to be heated in any suitable way, as by the gas burner 11. A conduit 12 leads upwardly for some distance from the upper part of generator 10 and thence downwardly to the point where conduit 13 communicates with conduit 12. The greater part of this downwardly extending portion of conduit 12 is cooled by any suitable means, as for instance, the water jacket 14. Beyond the point of communication with conduit 13 conduit 14 passes upwardly for some distance and this portion of conduit 12 is supplied with a number of baffles 15 and 33. Baffles 15 are in the upper part of conduit 12 while baffles 33 are in the lower part. Baffles 33 are provided with holes in their lower edges adjacent to conduit 12 so as to provide a continuous path therethrough. The purpose of these holes is to allow any liquid which collects on the baffles to run downwardly to conduit 13. Conduit 12 then passes downwardly to the top of evaporator 16 which is in heat exchange relation with the objective of refrigeration, for example the interior of a domestic refrigerator cabinet. This last referred to downwardly extending portion of conduit 12 is cooled in any suitable manner, as by the radiating fins 17.

The interior of evaporator 16 is provided with a series of disks 18. Disks 18 are supplied with apertures 19 surrounded by raised rims 20. A conduit 28 connects the bottom of evaporator 16 with the lower part of absorber 21. Absorber 21 is provided with a series of disks 22 which may be similar to disks 18 in evaporator 16. A conduit 23 connects the top of absorber 22 with the upper part of evaporator 16. Absorber 21 is partially surrounded by water jacket 29. Cooling water is supplied to water jacket 29 through conduit 30 and is discharged through conduit 31. Conduit 31 leads the cooling water to water jacket 14 and the water is finally discharged therefrom through conduit 32. A conduit 24 leads from the bottom of absorber 22 to heat exchanger 25. A conduit 26, a portion of which is arranged to form a liquid seal 27, leads from heat exchanger 25 to within the vapor space above the liquid in generator 10. Conduit 13 passes from conduit 12 through heat exchanger 25 to the upper part of absorber 21.

The operation of the apparatus is as follows:

A solution consisting of a refrigerant, for instance ammonia, dissolved in an absorbing medium, for instance water, is contained within generator 10. Although, for convenience in reference, ammonia and water have been specified, it is to be understood that the use of other refrigerants and absorbing media are also contemplated. It is necessary, however, that the refrigerant have a substantially lower boiling point than the absorbing medium.

The application of heat from burner 11 to the solution in generator 10 causes the liquid to boil and pass upwardly through the generator as a mixture of ammonia vapor and water vapor (steam). This mixture passes through conduit 12 to that portion of conduit 12 which is surrounded by water jacket 14. Here the temperature of the vaporous mixture is reduced sufficiently to liquefy the water vapor but not sufficiently to liquefy the ammonia vapor. The water runs downwardly through conduit 12 to conduit 13 and through conduit 13 to the top of absorber 21. The ammonia vapor continues through conduit 12 and any water or water vapor that fails to pass into conduit 13 but is entrained with the ammonia is separated therefrom by the baffles 15 and 33 placed in the upwardly extending portion of conduit 12 and runs back to conduit 13. The now dry ammonia vapor passes into that portion of conduit 12 which is cooled by radiating fins 17. Here the temperature of the ammonia is reduced sufficiently to liquefy it. The liquid ammonia passes into the top of evaporator 16. An auxiliary gas inert with respect to ammonia and having a considerably different specific weight, for example hydrogen, is introduced into the top of the evaporator through conduit 23. The ammonia diffuses into the hydrogen and refrigeration takes place. Disks 18 aid in the diffusion. The mixture of gaseous ammonia and hydrogen has a greater specific weight than the relative pure hydrogen which enters through conduit 23 and the mixture passes downwardly through apertures 19 in disks 18 within evaporator 16. The mixture passes out of evaporator 16 through conduit 28 to the lower part of absorber 21. Here the ammonia is absorbed by the water which passes downwardly through the absorber from conduit 13. The relatively light hydrogen passes upwardly through absorber 21 and through conduit 23 to the upper part of evaporator 16 where it once more mixes with ammonia.

Heat is evolved by the absorption of ammonia by water in absorber 21 and this heat is carried away by the cooling water. The solution of ammonia in water formed in absorber 21 passes out the bottom thereof through conduit 24 to heat exchanger 25. Here the solution is brought in heat exchange relation with the hotter condensate which passes through conduit 13 and the solution absorbs heat from the condensate. From heat exchanger 25 the solution passes through conduit 26 to generator 10. In generator 10 the water and ammonia are again vaporized as previously described. A portion of conduit 26 is so shaped as to form a liquid seal 27, the purpose of which is to prevent the passage of any ammonia or water vapor from generator 10 to absorber 21 through conduit 26.

Fig. 2 shows another form of apparatus carrying out my invention. Reference character 10 again designates a generator. A pocket 51 extends upwardly from the bottom within generator 10. Within pocket 51 is an electrical element 52. A conduit 53 connects the upper part of generator 10 with a point somewhat above the bottom of rectifier chamber 54. A series of baffles 55 are placed within member 54. One leg of a U-shaped member 56 extends within and opens into member 54 and is provided with a series of baffles 57. Member 54 is surrounded by a water jacket 58. Cooling water is supplied to water jacket 58 through conduit 59 and discharged through conduit 60. A conduit 61 communicates with the upper part of member 54, passes through water jacket 62 and enters the leg of U-shaped member 56 that does not extend within member 55. A conduit 63 establishes communication between the upper part of this leg and heat exchanger 64.

A conduit 65 communicates with U-shaped member 56 at a point near the bottom and passes downwardly through conduit 66, horizontally within heat exchanger 64 and upwardly within conduit 67 to within the upper part of evaporator 16. Evaporator 16 consists of a cylindrical member closed at the top and provided with a series of disks 68. Disks 68 are formed with apertures 69 around which are raised rims 70. The lower part of evaporator 16 is connected to space 71 by conduit 72. Space 71 is formed within heat exchanger 64 between tube heads 73 and 74, around tubes 75 and conduit 65. A conduit 76 connects space 71 with the lower part of absorber 21. Evaporator 16 is situated within the space to be cooled represented by the dotted rectangle 88.

Absorber 21 is a cylindrical member partially surrounded by a water jacket 77. Cooling water is supplied to water jacket 77 through conduit 78 and is discharged through conduit 79 to water jacket 62 and is finally discharged through conduit 80. Absorber 21 is provided with disks 81 which may be similar to disks 68 in evaporator 16. A conduit 66 connects the upper part of absorber 21 with space 82 formed within heat exchanger 64 between tube head 73 and the adjacent end of the heat exchanger. A plurality of tubes 75 are secured in tube heads 73 and 74 in any suitable manner and establish communication between spaces 82 and 83. Space 83 is formed within heat exchanger 64 between tube head 74 and the adjacent end of the heat exchanger. Conduit 67 connects space 83 with the upper part of evaporator 16.

A conduit 84 communicates with the lower part of absorber 21, passes in heat exchange relation through jacket 85 and opens into generator 10 at a point above the liquid level therein. A portion of conduit 84 forms a U-seal 27. A conduit 86 connects the bottom of rectifier member 54 with one end of jacket 85. A conduit 87 communicates with the other end of jacket 85, passes through water jacket 77 and opens into the upper part of absorber 21.

The operation of the apparatus shown in Fig. 2 is similar to that of the apparatus shown in Fig. 1. Heat is applied from the electrical heating element 52 to the solution consisting of the refrigerant, for instance ammonia, dissolved in an absorbing medium, for instance water, contained in generator 10. The application of heat to the solution causes the vaporization of both the ammonia and the water. The vaporous mixture of ammonia and water passes upwardly through generator 10 and conduit 53 to within rectifier member 54. In member 54 the temperature of the mixture is reduced sufficiently to liquefy the water vapor but not the ammonia. This reduction in temperature is caused partially by the cooling water in water jacket 58 and partially by the liquid ammonia in U-shaped member 56. The liquid ammonia in member 56 tends to stabilize the temperature in rectifier 54 and maintain it at a value below the boiling point of water, but above the boiling point of ammonia. The liquid ammonia in member 56 is at a temperature very close to its boiling point but a perfect equalization of temperature between it and the vaporous ammonia in rectifier 54 would be required for condensation of the latter to occur. On the other hand, before the temperature in rectifier 54 is able to rise much above the boiling point of ammonia the liquid ammonia in member 56 must be completely vaporized. Thus to those skilled in the art it is apparent that the latent heat of vaporization of ammonia is utilized to maintain a substantially constant temperature in rectifier 54. Any ammonia that is vaporized in member 56 passes out the top thereof into rectifier 54. The arrangement should be designed or may be so carried out that the temperature of the cooling water does not drop much below the boiling point of ammonia. If desired, a temperature regulator may be used for this purpose.

The water vapor which is liquefied in rectifier 54 passes out the bottom thereof through conduit 86, jacket 85 and conduit 87 to the upper part of absorber 21. Baffles 55 and 57 prevent any water vapor passing rapidly through rectifier 54 before it has a chance to condense. The dry ammonia vapor passes from the upper part of rectifier 54 into conduit 61 in which it is liquefied by the cooling water in water jacket 62 and flows into the leg of U-shaped member 56 which does not extend within rectifier 54. A small quantity of the inert gas may pass from absorber 21 to generator 10 and thence through rectifier 54 and conduit 61 to member 56. This gas is vented by conduit 63. The level of the liquid ammonia in member 56 is substantially the same, or very slightly above, the highest point of conduit 65 where it enters evaporator 16.

The liquid ammonia flows through conduit 65 by gravity and enters evaporator 16 where it is distributed over disks 68. A gas, inert with respect to ammonia, for instance hydrogen, is introduced into evaporator 16 through conduit 67. The ammonia evaporates in the presence of the hydrogen and a reduction in temperature occurs which produces refrigeration. The gaseous mixture of ammonia and hydrogen thus formed in the evaporator has a greater specific weight than the relatively pure hydrogen in conduit 67 and passes downwardly through apertures 69 to the bottom of the evaporator. From evaporator 16 the mixture passes through conduit 72 to space 71 within heat exchanger 64 and thence through conduit 76 to the lower part of absorber 21.

Within absorber 21 the gaseous mixture of ammonia and hydrogen comes in intimate contact with water which passes downwardly from conduit 87 over disks 81. The water absorbs the ammonia while the hydrogen remains unabsorbed and passes upwardly through the absorber and through conduit 66 to space 82 in heat exchanger 64. The heat produced by the absorption process is carried away by the cooling water. From space 82 the hydrogen passes through tubes 75 to space 83 and thence through conduit 67 to the upper part of evaporator 16. Within heat exchanger 64 the liquid ammonia in conduit 65 and the hydrogen in tubes 75 are cooled before they enter the evaporator by the mixture of gaseous ammonia and hydrogen in space 71 which has just left the evaporator.

The solution of ammonia in water which is formed in the absorber flows from the bottom thereof through conduit 84 to generator 10. The liquid seal 27 prevents the passage of any vapor from generator 10 through conduit 84 to the absorber. The water which passes through conduit 86 to jacket 85 is at a relatively high temperature and gives up some of its heat to the solution within conduit 84. From jacket 85 the water flows through conduit 87, is further cooled by cooling water in water jacket 77, and enters the upper part of absorber 21.

The various water jackets may be coupled to a common source of cooling water in any desired manner.

While I have illustrated and explained more or less specific forms of my invention, it is to be understood that I am not limited thereby but the scope of the invention is to be determined by the state of the prior art taken in connection with the appended claims.

Having thus described my invention, what I claim is:

1. Absorption refrigerating apparatus comprising, in combination, a generator, a first condenser, an absorber, a second condenser, means to conduct liquid from said first condenser to said absorber and gas from said first condenser to said second condenser, an evaporator, means to conduct liquid from said second condenser to said evaporator, means to conduct gas from said evaporator to said absorber, means to conduct liquid from said absorber to said generator and means to conduct vapor from said generator to said first condenser.

2. That process of treating a solution of a refrigerant in a liquid absorption medium of higher boiling point than the refrigerant to produce refrigeration which comprises expelling the refrigerant from solution by application of heat, vaporizing the liquid absorption medium by application of heat, condensing the absorption medium but not the refrigerant while in the presence of each other, separating the liquefied absorption medium from the gaseous refrigerant, condensing the refrigerant, evaporating the liquid refrigerant in heat exchange relation with the objective of refrigeration, returning the evaporated refrigerant to the presence of the separated absorption medium to be absorbed thereby and returning the solution thus formed to the place of heat application.

3. That improvement in the art of refrigerating through the agency of an absorption system including a generator, an absorber and an evaporator and containing a refrigerant and a liquid absorption medium in which the refrigerant is dissolved which consists in gasifying both the refrigerant and the absorption medium in the generator, separately condensing the refrigerant and absorption medium and simultaneously conducting the liquefied absorption medium and liquefied refrigerant in parallel to the absorber and evaporator respectively.

4. That improvement in the art of refrigerating through the agency of an absorption system employing a refrigerant and an absorption medium therefor which consists in vaporizing both the refrigerant and the absorption medium in heat exchange relation with a source of heat, liquefying the gaseous absorption medium at a higher temperature than the boiling point of the refrigerant, separating the liquid absorption medium from the gaseous refrigerant by gravity, liquefying the gaseous refrigerant, evaporating the gaseous refrigerant in heat transfer relation with the objective of refrigeration and in the presence of an inert gas, introducing the mixture of evaporated refrigerant and inert gas into the presence of the separated liquid absorption medium and thus absorbing the refrigerant and liberating the inert gas, returning the inert gas to the presence of the liquefied refrigerant and returning the separated absorption liquid enriched with refrigerant to heat exchange relation with the source of heat.

5. Absorption refrigerating apparatus comprising, in combination, a generator, a first condenser, an absorber, a separator, a second condenser, means to conduct liquid under the influence of gravity from said first condenser and from said separator to said absorber and gas from said first condenser to said second condenser through said separator, an evaporator, means to conduct liquid from said second condenser to said evaporator, means to conduct gas from said evaporator to said absorber, means to conduct liquid from said absorber to said generator and means to conduct vapor from said generator to said first condenser.

6. Absorption refrigerating apparatus comprising, in combination, a generator, a first condenser, an absorber, a second condenser and containing refrigerant fluid, absorption liquid and an auxiliary gas, means to conduct liquid from said first condenser to said absorber and gas from said first condenser to said second condenser, an evaporator, means to conduct liquid from said second condenser to said evaporator, conduits connecting said evaporator and absorber and arranged to permit circulation of said auxiliary gas between the evaporator and absorber due to force produced within the apparatus, means to conduct liquid from the absorber to the generator under the influence of gravity and means to conduct vapor from said generator to said first condenser.

7. That process of treating a solution of a refrigerant in a liquid absorption medium of higher boiling point than the refrigerant to produce refrigeration which comprises expelling the refrigerant from solution in heat exchange relation with a source of heat, vaporizing the liquid absorption medium also in heat exchange relation with said source of heat, condensing the absorption medium but not the refrigerant while in the presence of each other, separating the liquid absorption medium from the gaseous refrigerant by gravity, condensing the refrigerant, evaporating the liquid refrigerant in heat exchange relation with the objective of refrigeration and in the presence of an auxiliary gas, circulating the auxiliary gas into the presence of the separated absorption medium and back to the presence of the liquefied refrigerant to transfer the evaporated refrigerant to the presence of the absorption medium to be absorbed thereby and returning the solution thus formed to heat exchange relation with said source of heat.

8. That improvement in the art of refrigerating through the agency of an absorption system including a generator, an absorber and an evaporator and containing a refrigerant and a liquid absorption medium in which the refrigerant is dissolved which consists in gasifying both the refrigerant and the absorption medium in the generator, separately condensing the refrigerant and absorption medium, simultaneously conducting the liquefied absorption medium and liquefied refrigerant in parallel to the absorber and evaporator respectively, generating circulating force within the system, circulating an auxiliary gas through the evaporator and absorber due to said force and conducting enriched absorption medium from the absorber to the generator under the influence of gravity.

9. Absorption refrigerating apparatus comprising, in combination, a generator, a rectifier, an absorber, an evaporator, means to conduct a binary vapor from said generator to said rectifier, means to cool said rectifier both by fluid within said apparatus and fluid outside said apparatus and to separate the individual fluids of the binary vapor and condense one of said fluids, means for condensing the second of said fluids and returning the same to the rectifier and means to conduct the fluids separately to the absorber and evaporator.

10. Absorption refrigerating apparatus comprising, in combination, a generator, an absorber, an evaporator, a first condenser situated above said generator and above said absorber, a second condenser situated above said generator and above said evaporator, means to conduct vapor from said generator to said first condenser, means to conduct liquid by gravity from said first condenser to said absorber and gas from said first condenser to said second condenser, means to conduct liquid by gravity from said second condenser to said evaporator, means to conduct gas from the evaporator to the absorber and means to conduct liquid from the absorber to the generator.

11. Absorption refrigerating apparatus comprising, in combination, a generator, an absorber, an evaporator, a first condenser situated above said generator and above said absorber, a second condenser situated above said generator and above said evaporator, means to conduct vapor from said generator to said first condenser, means to conduct liquid by gravity from said first condenser to said absorber and gas from said first condenser to said second condenser, means to conduct liquid by gravity from said second condenser to said evaporator, a plurality of conduits connecting the evaporator and absorber for continuous circulation in one direction of gaseous fluid between the evaporator and absorber and means to conduct liquid from the absorber to the generator.

In testimony whereof I hereunto affix my signature.

KARL ALEXANDER WESSBLAD.